(12) United States Patent
Wang et al.

(10) Patent No.: US 8,355,894 B2
(45) Date of Patent: Jan. 15, 2013

(54) METHOD FOR SIMULATING CASTING DEFECTS AND MICROSTRUCTURES OF CASTINGS

(75) Inventors: Qigui Wang, Rochester Hills, MI (US); Gerald Peter Backer, Southfield, MI (US); Daniel L. Metzger, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 12/653,606

(22) Filed: Dec. 16, 2009

(65) Prior Publication Data

US 2011/0144788 A1    Jun. 16, 2011

(51) Int. Cl.
*G06F 17/50* (2006.01)
*G06F 7/60* (2006.01)
*G06F 17/10* (2006.01)
*G06G 7/48* (2006.01)
*B22D 46/00* (2006.01)
*B22D 11/00* (2006.01)

(52) U.S. Cl. ....... 703/1; 703/2; 703/6; 164/4.1; 164/451
(58) Field of Classification Search .................. 703/2, 6, 703/1; 164/4.1, 451
See application file for complete search history.

(56) References Cited

U.S. PATENT DOCUMENTS

| 5,377,119 | A  | * | 12/1994 | Backer et al. | 700/146 |
| 6,912,913 | B2 | * | 7/2005  | Murakami      | 73/808  |
| 7,016,825 | B1 | * | 3/2006  | Tryon, III    | 703/6   |
| 7,623,973 | B1 | * | 11/2009 | Wang et al.   | 702/34  |
| 8,155,940 | B2 | * | 4/2012  | Wang et al.   | 703/6   |

FOREIGN PATENT DOCUMENTS

DE    102007037463 B3    6/2008

OTHER PUBLICATIONS

Pequet, et al., Modeling of Microporosity, Macroporosit, and Pipe-Shrinkage Formation during the Solidification of Alloys Using a Mushy-Zone Refinement Method: Applications to Aluminum Alloys, Metallurgical and Materials Transactions A, vol. 33A, Jul. 2002, pp. 2095-2106.

Atwood, et al., Diffusion-Controlled Growth of Hydrogen Pores in Aluminum-Silicon Castings: In Situ Observation and Modelling, 2000 Acta Metallurgica Inc., Published by Elsevier Science Ltd., pp. 405-417.

Backer, et al., Microporosity Simulation in Aluminum Castings Using an Integrated Pore Growth and Interdendritic Flow Model, Metallurgical and Materials Transactions B, vol. 38B, Aug. 2007, pp. 533-540.

Lee, et al., Modeling Microporosity in Aluminum-Silicon Alloys: A Review, Journal of Light Metals, www.elsevier.com/locate/ligandmet, 2001, pp. 15-30.

* cited by examiner

*Primary Examiner* — Mary C Jacob
*Assistant Examiner* — Aniss Chad
(74) *Attorney, Agent, or Firm* — Dinsmore & Shohl LLP

(57) ABSTRACT

Systems for predicting casting defects and microstructure in suppliers/vendors' castings for part/system durability analysis without knowing the details of the casting layout and casting gating and riser design as well as casting process parameters are provided. The systems involve the use of an integrated pore growth and interdendritic flow model. Methods of predicting casting defects and microstructures of a part without knowing the details of the casting layout and casting gating and riser design as well as casting process parameters and articles of manufacture are also provided.

20 Claims, 14 Drawing Sheets

(4 of 14 Drawing Sheet(s) Filed in Color)

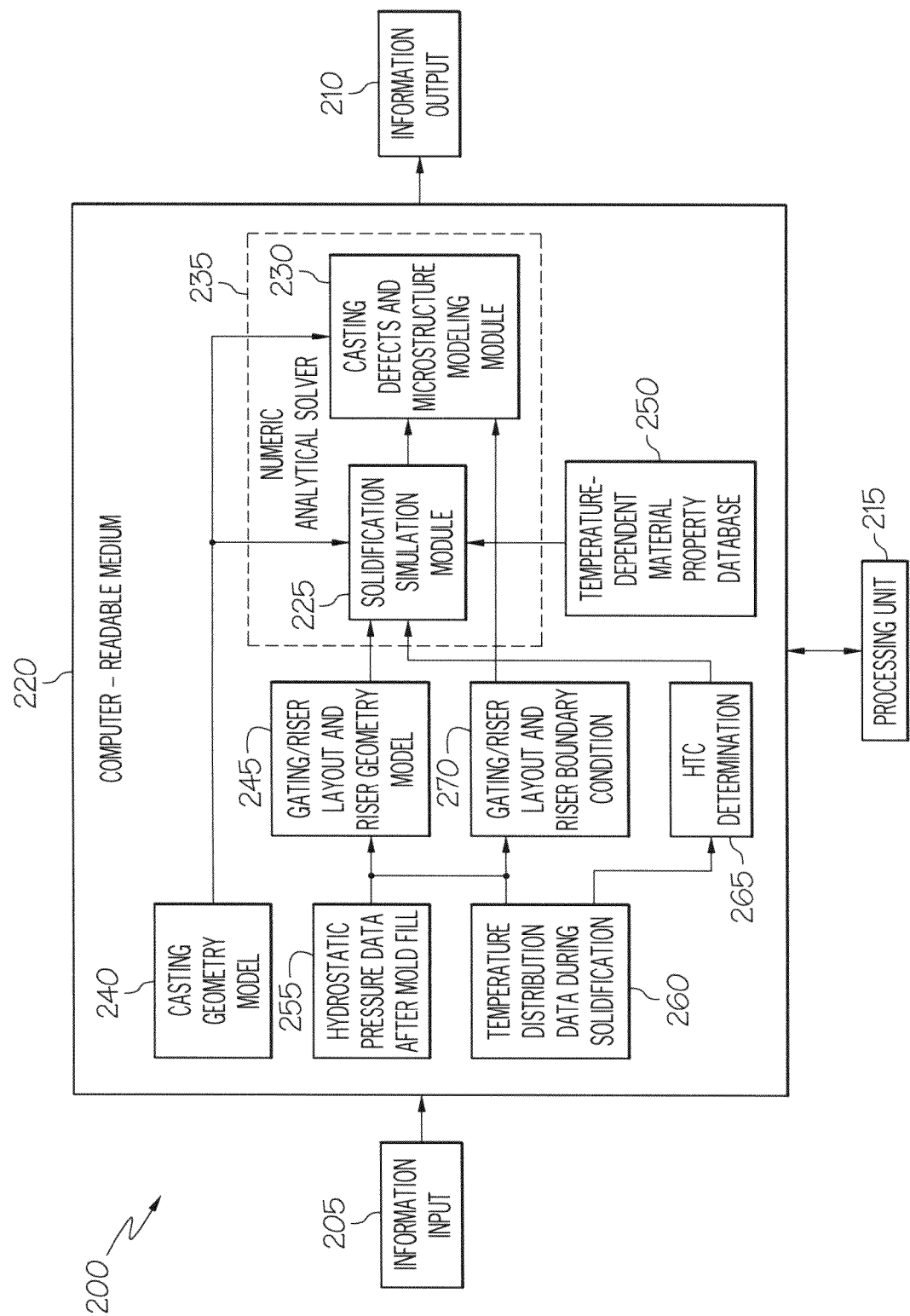

METHOD FOR SIMULATING CASTING DEFECTS AND MICROSTRUCTURES OF CASTINGS

BACKGROUND OF THE INVENTION

This invention is generally related to predictions of casting defects and microstructures in castings, and in particular, to a methodology to simulate and predict the size and volume fraction of casting defects and microstructures in the castings without knowing the casting gating and riser design.

Aluminum castings are widely used in structural applications because of their high strength to weight ratio, good corrosion resistance, and relatively low raw material cost. Although it is cost competitive with other manufacturing methods, the casting process associated with aluminum alloys can introduce a substantial amount of defects, such as microporosity and oxides, into the material which significantly reduce fatigue and other mechanical properties.

Predicting the occurrence of such defects, as well as alloy and process dependent microstructures, prior to establishing a manufacturing process would be of significant value, as design and manufacturing alternatives could be explored and eventually optimized that would lead to improved reliability in the cast product.

Mathematical modeling of casting processes is now highly advanced, with commercial programs available to predict mold filling and solidification behavior for virtually any casting process. Software that predicts macro-scale thermal, pressure, and velocity distribution as well as macro defects such as trapped air and macro shrinkage porosity from mold filling and solidification is readily available, with the accuracy dependent upon the numerical methods and boundary conditions applied. However, the prediction of microporosity, oxides, and detailed microstructures is much less advanced and is very limited in commercial programs.

To predict casting defects and microstructure formed during mold filling and solidification processes accurately, the full mold geometry must be part of the model. The mold geometry and construction (e.g., locations, sizes of gates, runners, and risers, mold materials, part orientation in the mold during pouring and solidification, etc.) are important intellectual properties of foundries. Accordingly, foundries are reluctant to share this information.

Many customers purchase cast aluminum parts/systems from various suppliers. An accurate reliability analysis of those parts/systems becomes problematic because the casting defects and microstructure in those purchased parts/systems cannot be predicted with the existing approach.

Therefore, there is a need for a method of predicting casting defects and microstructure in cast aluminum parts when the details of the casting layout and gating/riser design as well as casting process parameters are not known.

SUMMARY OF INVENTION

Systems, methods, and articles of manufacture for simulating the casting defects and microstructure in suppliers'/vendors' castings for part/system durability analysis without knowing one or more of the details of the casting layout and casting gating and riser design as well as casting process parameters are provided.

Casting process analysis tools have been developed to predict melt flow and heat transfer during mold filling and solidification. This code requires a full mesh (geometry) of casting, gating, risers, and all mold parts. While the casting geometry is available to the customer, the other parts are foundry proprietary and not readily available, in particular for the parts made by parts suppliers. The method involves having the parts supplier use a commercial software program to perform the mold filling and solidification analysis at their location with a full model including their proprietary parts and a casting geometry/mesh created by the customer, and then providing the customer with pressure distributions of the casting model after mold filling and temperature distributions during solidification. The customer can then simulate the casting defects and microstructure based on the developed integrated pore growth and interdendritic flow model as well as the temperature and pressure distributions provided by the parts supplier without knowing parts supplier's proprietary casting gating and riser design.

This method would obviate having to ask parts suppliers to disclose proprietary information about their casting system design and casting process parameters. The customer could predict the casting defects and microstructures and thus conduct a more accurate durability analysis of the parts supplier's part/system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates a system to predict casting defects and microstructure of aluminum castings without knowing detailed mold geometry and construction according to another embodiment of the present invention.

DETAILED DESCRIPTION OF THE INVENTION

A method has been developed to simulate casting defects and the microstructure of cast aluminum parts/systems without knowing one or more of the detailed mold geometry and construction which includes locations and sizes of gates/runners/risers, mold materials, part orientation in the mold during pouring and solidification, etc and casting process parameters. Using commercial casting process analysis codes, a parts supplier performs the analysis with a full model involving their proprietary parts and a casting geometry created by the customer. The parts supplier provides the customer with pressure distributions of the casting model after mold filling and temperature distributions of the casting model during solidification. The customer uses inverse calculation and engineering approaches to determine heat transfer coefficients and boundary conditions, as well as gating/riser system and mold geometry and construction based on the temperature and pressure distributions provided by the parts supplier. With the provided pressure and temperature distributions or inversely calculated heat transfer coefficients and boundary conditions, as well as estimated gating/riser and mold geometry and construction, the casting defects and microstructures can be predicted in either casting or machined parts/systems based on the developed integrated pore growth and interdendritic flow model and the selectively applied velocity/pressure boundary conditions methods.

Figure 1:
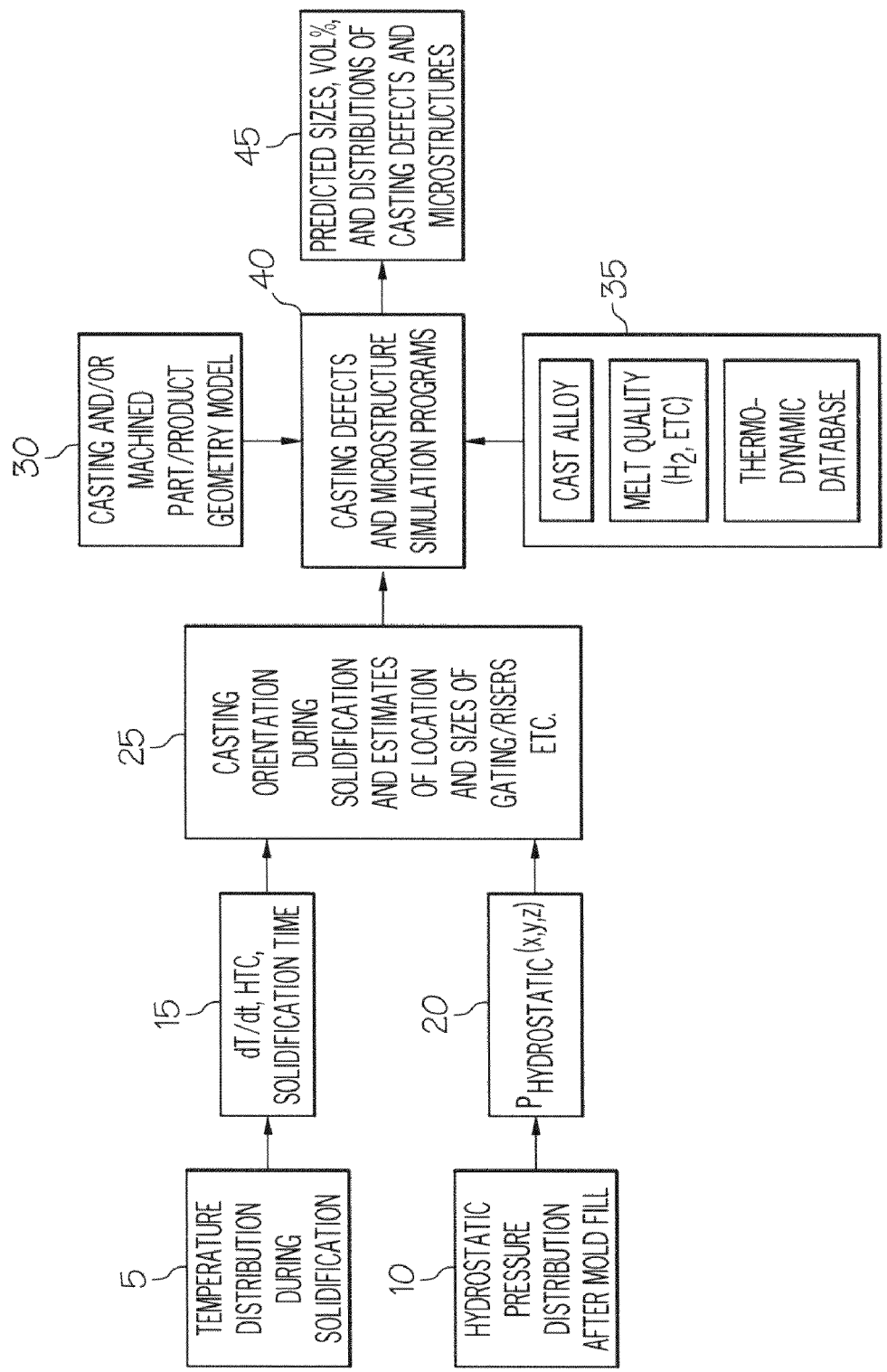
FIG. 1 is a schematic illustration showing a method for predicting casting defects and microstructure of aluminum castings without knowing detailed mold geometry and construction.

FIG. 1 summarizes the method. The temperature distribution during solidification of block 5 and the hydrostatic pressure distribution after mold fill of block 10 are calculated by the parts supplier using commercially available software. This information is provided to the customer. The customer uses that information to determine the dT/dt, HTC (heat transfer coefficients), and solidification at block 15, and the hydrostatic pressure at block 20, which are then used to determine the casting orientation during solidification and to estimate the location and size of the gating/risers, etc. at block 25. That information is combined with the casting and/or machined part/product geometry model from block 30 and information concerning the material used, the melt quality, and thermodynamic database from block 35 to simulate the casting defects and microstructure at block 40. The simulation predicts the sizes, volume %, and distributions of the casting defects and microstructures at block 45.

Figure 2A:
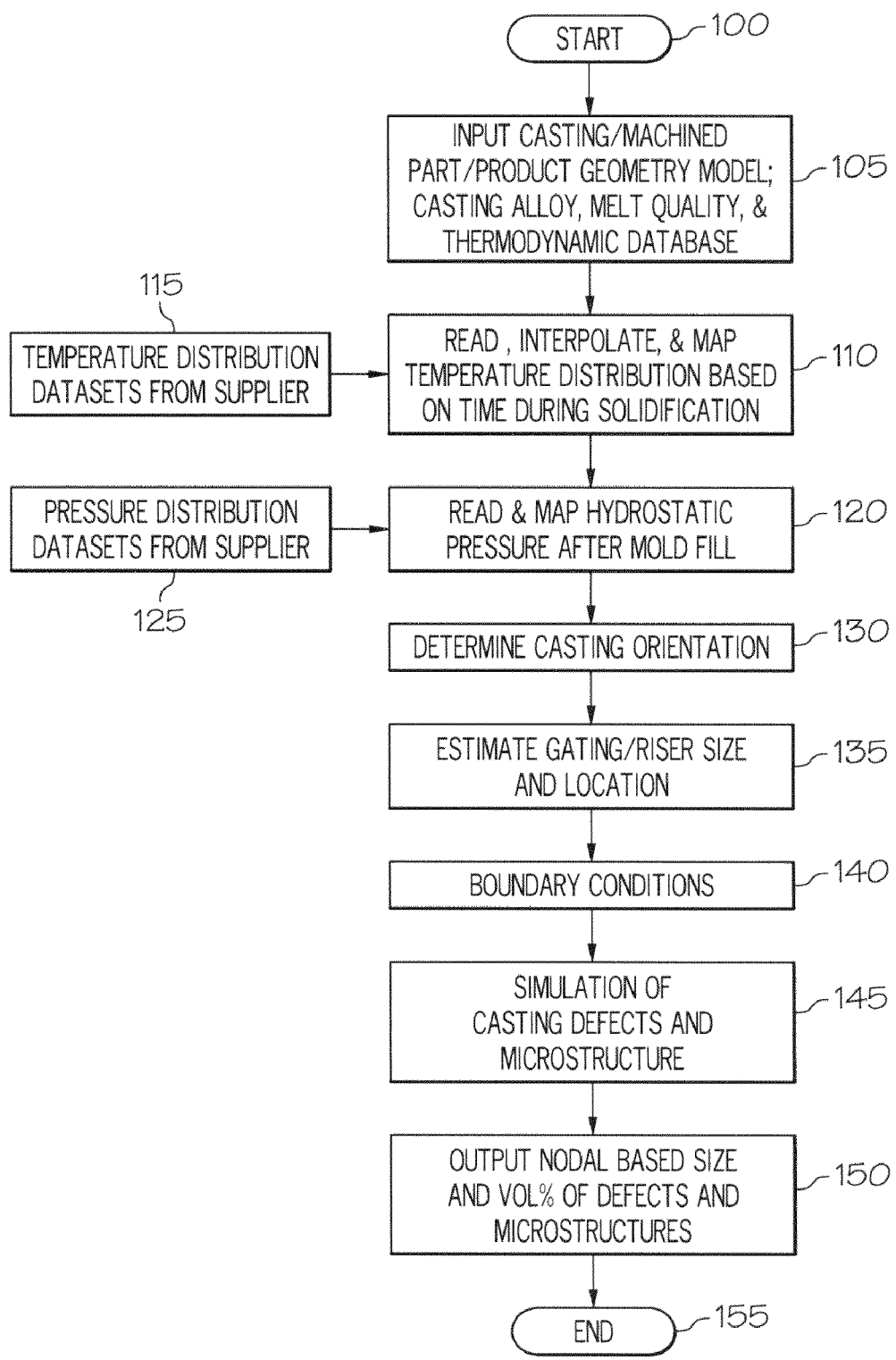
FIG. 2A-B are flow charts showing two embodiments of the simulation process of the present invention.

FIG. 2A is a flow chart of one embodiment of the system and method. The process starts at block 100. At block 105 the casting/machined part/product geometry model, casting alloy, melt quality, and thermodynamic database are entered. The system reads, interpolates, and maps the temperature distribution based on time during solidification at block 110 using the temperature distribution datasets from the parts supplier stored in block 115. The system reads and maps the hydrostatic pressure after mold fill at block 120 using the pressure distribution datasets from the parts supplier stored in block 125.

The datasets provided by supplier are for certain time or temperature intervals. Consequently, the temperatures and pressures between the datasets provided have to be interpolated. However, any interpolation will introduce some errors in comparison with actual solidification heat transfer simulation.

The casting orientation is then determined at block 130. The gating/runner/riser sizes and locations are estimated at block 135. The boundary conditions are then determined at block 140. The casting defects and microstructure are simulated at block 145 and the nodal based size and volume % of defects and microstructures are output at block 150. The process ends at block 155.

Figure 2B:
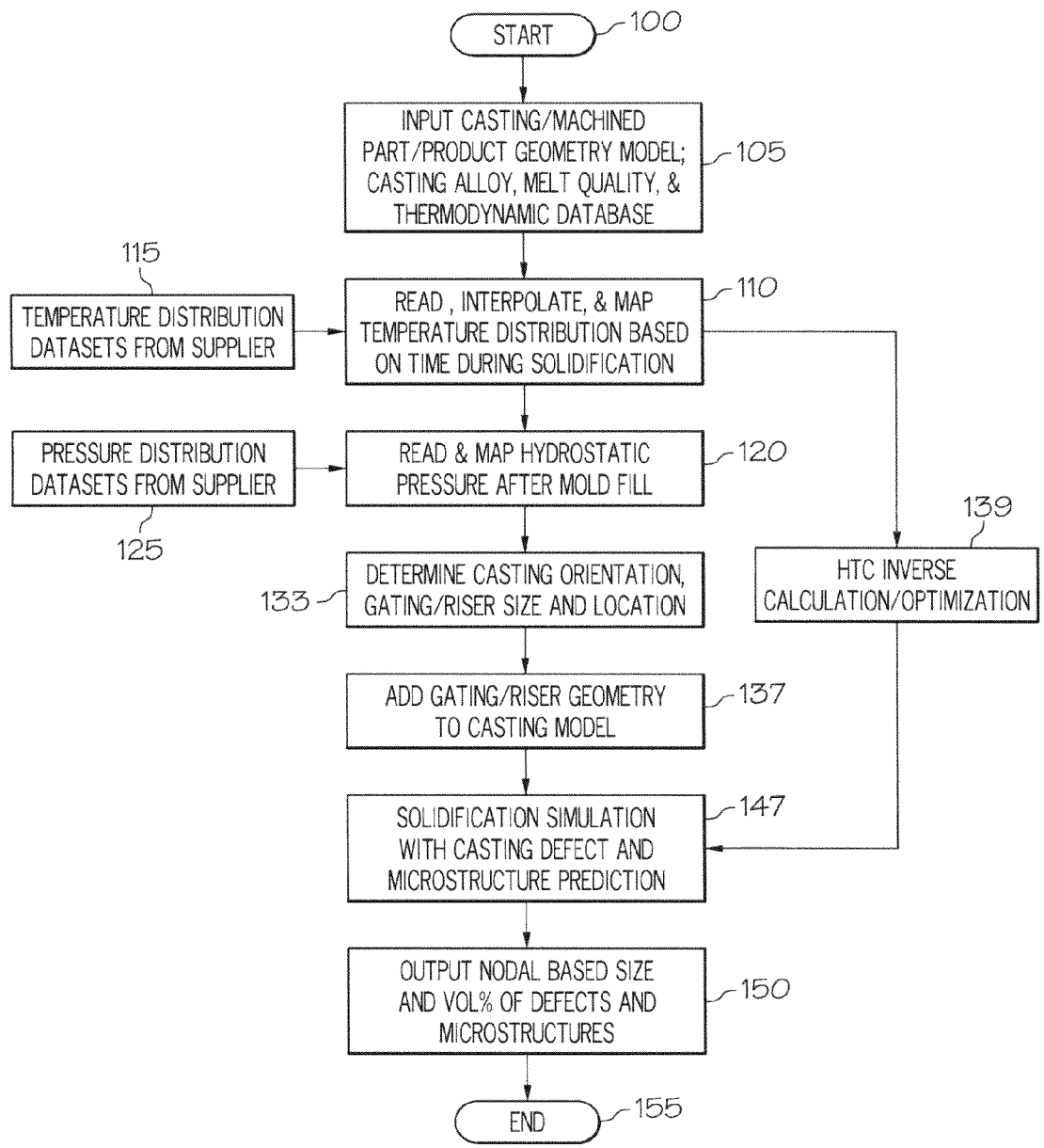

FIG. 2B is a flow chart of another embodiment of the system and method. The process starts at block 100. At block 105 the casting/machined part/product geometry model, casting alloy, melt quality, and thermodynamic database are entered. The system reads, interpolates, and maps the temperature distribution based on time during solidification at block 110 using the temperature distribution datasets from the parts supplier stored in block 115. The system reads and maps the hydrostatic pressure after mold fill at block 120 using the pressure distribution datasets from the parts supplier stored in block 125. The casting orientation, gating/runner/riser sizes and locations are determined at block 133. The gating/runner/riser geometry is added to the casting model at block 137. The solidification is simulated with casting defects and microstructure prediction at block 147 and the nodal based size and volume % of defects and microstructures are output at block 150. The process ends at block 155.

The temperature distribution datasets from block 110 are used for the inverse calculation and optimization of the HTC at block 139. The temperature distribution datasets from the supplier are used as target ("measured") temperatures. Heat transfer simulations of the casting are run with estimated HTCs which are iteratively optimized to minimize the errors between the calculated temperatures and the temperature datasets from the supplier using, for example, Equation 3 below. The determined HTCs are used for solidification simulation and casting defect and microstructure prediction at block 147 together with gating, runner, and riser sizes and locations from steps 120-137. This is an alternative to the method described in FIG. 2A. Although it involves more calculations, it should provide better results.

In one embodiment, shown in FIG. 3, a system 200 may predict the casting defects and microstructure of a part. The system 200 comprises an information input 205, an information output 210, a processing unit 215, and a computer-readable medium 220. The information input 205 is configured to receive the information relating to the casting, such as one or more of casting/machined part/product geometry, casting alloy, melt quality, thermodynamic database, and the hydrostatic pressure after mold fill and temperature distribution during solidification datasets from the parts supplier. The information output 210 is configured to convey information relating to the size and volume % of defects and microstructures predicted by the system. The computer-readable medium 220 comprises a computer readable program code embodied therein, the computer readable program code comprising solidification simulation module 225, and casting defects and microstructure modeling module 230. Further, the computer-readable medium may comprise a numeric analytical solver 235. The numeric analytical solver may comprise at least one of the solidification simulation module 225, and casting defects and microstructure modeling module 230, and be cooperatively coupled with any of the solidification simulation module 225, and casting defects and microstructure modeling module 230. The numeric analytical solver can be finite element analysis based or finite difference analysis based.

The solidification simulation module 225 utilizes information from the casting geometry model 240, the gating/riser layout and riser geometry model 245, and the temperature-dependent material property database 250. The hydrostatic pressure data after mold fill 255 and the temperature distribution data during solidification 260 from parts supplier are used in the gating/riser layout and riser geometry model 245. The temperature distribution data during solidification 260 is used in the HTC determination 265. This information is used by the solidification simulation module 225.

The casting defects and microstructure modeling module 230 utilizes information from the casting geometry model 240, the temperature-dependent material property database 250, the solidification simulation module 225, and the gating/riser layout and riser boundary condition 270. The hydrostatic pressure data after mold fill 255 and the temperature distribution data during solidification 260 from parts supplier are used in the gating/riser layout and riser boundary condition 270.

The processing unit 215 is in communication with, and processes the calculations and other data of, the computer-readable medium 220 to predict the casting defects and microstructure of a part.

Although the following example refers to aluminum castings, the same process would apply for other materials, such as metals and alloys of metals, as would be understood by those of skill in the art. Examples of suitable materials include, but are not limited to, aluminum, magnesium, steel, and their alloys. In addition, the method can be used for machined parts as well as castings. For convenience, the term "castings" will be used to include both castings and machined parts.

1. Determination of Temperature-Dependent Zone-Optimal Heat Transfer Coefficients (HTC)

During solidification, the heat transfer of a solidifying aluminum casting follows the energy equation and can be simplified as:

$$\frac{\partial(\rho C_p T)}{\partial t} = -\nabla \cdot (\rho u C_p T) + \nabla(\lambda \nabla T) - \rho L \frac{\partial f_l}{\partial t} \quad (1)$$

where $\rho$ is the density (kg/m³); $C_p$ is the specific heat (J·g⁻¹·K⁻¹); T is the temperature (K); u is the velocity vector (m·s⁻¹), L is the latent heat (J·kg⁻¹); and $\lambda$ is the thermal conductivity (W·m⁻¹·K⁻¹).

During solidification, the temperature profile of the casting is controlled by the thermal boundary conditions across the metal/mold interface. The heat transfer across the metal/mold interface can be simplified as:

$$Q = h_{ic}(T_c - T_m) \quad (2)$$

where Q is the surface heat flux; $h_{ic}$ is the interfacial heat transfer coefficient; $T_c$ is the surface temperature of the casting at the interface; and $T_m$ is the mold temperature at the interface.

As an embodiment in this invention, the proposed zone-optimal heat transfer coefficients are optimized using inverse calculation. With the temperature-dependent heat transfer coefficient values assumed for different zones, the temperature history/profile of the casting can be calculated using heat transfer software including commercial programs, for example ABAQUS (Dassault Systemes), Ansys (Ansys, Inc), WRAFTS (Flow Logic), EKK (EKK, Inc), ProCAST (ESI Corp), MagmaSoft (MAGMA Gießereitechnologie GmbH), etc. or customer developed codes. During the course of the heat transfer coefficient optimization, the temperature- and zone-dependent heat transfer coefficients are determined using a gradient method and the calculated thermal history/profile during solidification is compared with the temperature profile provided by the parts supplier for the related locations in the casting. The optimization process continues until the difference between the newly calculated thermal history/profile and the temperature profile provided by the parts supplier is minimized. In the inverse calculation, the objective function is expressed as:

$$\text{Error} = \sum_{i=1}^{N} \sqrt{\sum_{j=1}^{M} (T_{i,j}^{calc} - T_{i,j}^{pro})^2} \quad (3)$$

where $T_{i,j}^{calc}$ and $T_{i,j}^{pro}$ are the calculated and the provided temperatures at the $j^{th}$ time step of the $i^{th}$ location in the casting. M is the total number of comparisons made for a specific location, and N is the total number of the locations calibrated.

When the interfacial heat transfer coefficients are optimized, the mold materials and mold configuration can be determined for the casting.

This step can be used for the HTC determination 139 of FIGS. 2b and 265 of FIG. 3.

2. Determination of the Part Orientation in the Mold During Pouring and Solidification The part orientation in the mold during pouring and solidification can be determined in terms of hydrostatic pressure distribution throughout the whole casting/machined part. A non-turbulent, perfect, compressible, and barotropic fluid undergoing steady motion is governed by the Bernoulli equation:

$$\frac{u^2}{2g} + z + \frac{P}{g} = C \quad (4)$$

After mold filling, the macro-scale velocities can be considered as zero by ignoring the natural convection and inter-dendritic flow. Accordingly, Equation (4) can be simplified as:

$$z = C - \frac{P}{g} \quad (5)$$

where g is the gravity acceleration constant (9.81 m/s²; 32.2 ft/s²), u is the velocity of the fluid, and z is the height above an arbitrary datum. C remains constant along any streamline in the flow, but varies from streamline to streamline. If the flow is irrotational, then C has the same value for all streamlines.

According to Equation (5), the metallic height of every location in the aluminum casting and/or machined part can be calculated. By comparing the z value of every location in the aluminum casting, the part orientation during mold fill and solidification can be determined. The top location of the casting should have lower z values in comparison with the bottom part of the casting. If a riser is utilized in the casting, it is usually located at the upper portion of the casting, and thus the difference of z values between the top and the bottom surface of the casting reflects the height of the riser.

This step can be used in the gating/riser layout and riser geometry model 245 and the gating/riser layout and riser boundary condition 270 of FIG. 3.

3. Determination of Location and Sizes of Risers

Riser location can be readily determined from the temperature profile of the casting during solidification. In general, the riser solidifies last, and the temperature of the location in the casting near the riser is thus usually higher than surrounding areas. By comparing the temperatures of surface nodes of the casting, the location of the riser should be easily determined.

There are at least two ways to estimate the riser size. One is to use numeric modeling of the heat transfer process and to consider the riser as an external heat source. The temperature distribution of the casting with a riser can be simulated using:

$$\frac{\partial(\rho C_p T)}{\partial t} = -\nabla \cdot (\rho u C_p T) + \nabla(\lambda \nabla T) - \rho L \frac{\partial f_l}{\partial t} + \dot{Q}(T) \quad (6)$$

where $\dot{Q}(T)$ is the volumetric heat source which is temperature dependent. The riser size can be estimated by minimizing the error between the calculated temperature data and the temperature profile provided by the parts supplier.

Another way to figure out the riser size is based on the geometry modulus method. The geometric modulus of the riser is usually larger than that of the casting where feeding is needed. The modulus of the casting can be expressed as:

$$M_R = C \cdot M_C \quad (7)$$

where $M_R$ and $M_C$ are the moduli of the riser and casting, respectively; C is the constant that is dependent upon the casting process and complexity of the casting. For sand casting, the value of C varies between 1.5 and 3. The local modulus of the casting, $M_C$, can be calculated from the local solidification time, which is estimated from the temperature profile of the casting during solidification. For a given alloy and casting process, the local solidification time of a volume (V) in a casting is directly related to the local volume-to-surface area (V/A) ratio which is referred to as equivalent local geometry (section) modulus ($M_s$):

$$t_s = B\left(\frac{V}{A}\right)^2 = B(M_s)^2 \quad (8)$$

where B is the Chvorinov's constant and is given as:

$$B = \frac{\pi}{4}\left(\frac{\rho_{csting}\Delta H_{casting}}{T_{Melting} - T_{mold,initial}}\right)^2 \left(\frac{1}{k_{mold}\rho_{mold}C_{mold}}\right) \text{ for sand mold casting} \quad (9)$$

and $$B = \left(\frac{\rho_{casting}\Delta H_{casting}}{h(T_{melting} - T_{mold,initial})}\right) \text{ for metal mold casting} \quad (10)$$

where $\Delta H$ is the latent heat for the casting process ($=H_f \Sigma C_i \Delta T$), $H_f$ is the latent heat of solidification (fusion), h is the heat transfer coefficient, C is the specific heat, and $\rho$ is the density.

This step can be used in the gating/riser layout and riser boundary condition 270 of FIG. 3

4. Simulation of Casting Defects and Microstructure of the Castings

A. Microporosity

Microporosity in aluminum castings is simulated through the integration of a state-of-the-art interdendritic flow model and the newly developed pore growth model. Since the principal deficiencies of the interdendritic flow models are the assumptions needed to specify the pore size, it is proposed to combine a pore growth model with an interdendritic flow model, thus replacing the assumptions. By doing so, pores could nucleate and grow in response to the thermal and dynamic history of a casting, while the porosity in turn would modulate the flow field during solidification.

For the combined pore growth/interdendritic flow model, a population of pores is assumed to nucleate with an initial diameter of 10 microns when the hydrogen concentration is greater than the saturation concentration. The pores then grow by hydrogen diffusion through the liquid metal to the pore interface and pressure drop due to the shrinkage of the enclosed mushy metal. Individual pore volumes are summed to determine the pore volume in each element which provides feedback from the porosity calculations into the flow field.

The equations used in interdendritic flow models for microporosity are a momentum balance (Equation 11), the continuity equation (Equation 12), a thermal energy balance (Equation 13) and a transport equation and mass balance for hydrogen concentration (Equations 14, 15).

$$u = -\frac{K}{\mu}(\nabla P - \rho_l g) \quad (11)$$

$$\nabla \cdot u = \left(\frac{\rho_s}{\rho_l} - 1\right)\frac{\partial f_l}{\partial t} + \frac{\partial f_p}{\partial t} \quad (12)$$

$$\frac{\partial(\rho C_p T)}{\partial t} = \nabla \cdot (\rho u T) + \nabla(\lambda \nabla T) - \rho L \frac{\partial f_l}{\partial t} \quad (13)$$

$$\frac{\partial(\rho C_H)}{\partial t} = -\nabla \cdot (\rho u C_H) + \nabla(\rho D_H \nabla C_H) \quad (14)$$

$$[C_{H0}] = (1 - f_l)[C_{Hs}] + f_l[C_{Hl}] + R\frac{P_g f_p}{T} \quad (15)$$

The momentum balance (Equation 11) assumes that fluid flow is governed by Darcy's Law for flow through a porous medium of permeability K. In this equation, u is the superficial velocity vector, $\mu$ the viscosity, P the pressure, $\rho_l$ the liquid density and g is the gravity vector.

The continuity equation (Equation 12) balances the liquid flow into a volume against the change between liquid and solid density $\rho_l$ and $\rho_s$ and the pore volume fraction $f_p$. The thermal energy balance (Equation 13) consists of a balance of convection, diffusion, and the release of latent heat of fusion L into a volume element. Thermophysical properties for both liquid and solid are represented by the average density $\rho$, specific heat $C_p$, and the thermal conductivity $\lambda$. These thermophysical properties are temperature and composition dependent.

Equation 14 models the transport of hydrogen via a standard convection-diffusion model, while Equation 15 partitions the initial hydrogen concentration $C_{H0}$ into the solid phase concentration $C_{Hs}$, liquid phase concentration $C_{Hl}$ and the porosity formed. R is the universal gas constant.

Auxiliary equations are needed to relate the solid and liquid phase hydrogen concentrations to the pressure. These are given by Sievert's Law (Equations 16, 17), where $K_s$ and $K_l$ are the equilibrium coefficients, which are temperature and composition dependent.

$$[C_{Hs}] = K_s P_g^{1/2} \quad (16)$$

$$[C_{Hl}] = K_l P_g^{1/2} \quad (17)$$

The pressure of the hydrogen gas in the pores, $P_g$, is the sum of atmospheric pressure, metallostatic head, and pressure due to surface tension:

$$P_g = P_{atm} + P_{metal} + \frac{2\sigma_{LG}}{R_{cur}} \quad (18)$$

where $\sigma_{LG}$ is the surface tension of the alloy and $R_{cur}$ is the minimum radius of curvature of the pore.

Figure 4:
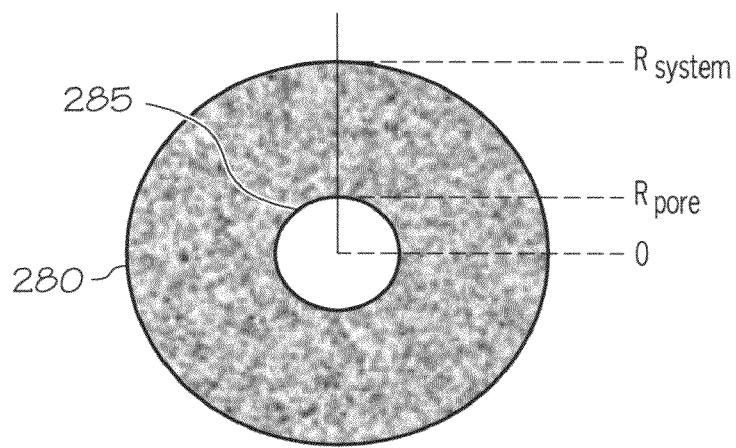
FIG. 4 is a schematic showing the geometric domain for the integrated pore growth and interdendritic flow model.

The theoretical basis for pore growth models is that pore growth is governed by the rate at which hydrogen diffuses to the pore/liquid interface. A diffusion equation (Equation 19) is therefore written for a specified volume of material surrounding a spherical pore of a specified initial radius. FIG. 4 is a schematic showing the geometric domain for the integrated pore growth and interdendritic flow model. The solid and liquid alloy 280 has a gas pore 285. The gas pore has a radius $R_{pore}$, while the alloy has a radius $R_{system}$. Hydrogen rejected to the liquid phase during solidification is represented by the source term $S_H$.

$$\frac{\partial \rho C_H}{\partial t} = \nabla (D_H \nabla C_H) + S_H \quad (19)$$

The diffusion equation is then solved in spherical coordinates while solidification proceeds, with boundary conditions given by: i) hydrogen concentration in the liquid, $C_{Hl}$, at the pore interface, $R_{pore}$, which is in equilibrium with the hydrogen gas pressure in the pore, $P_g$, per Sievert's Law; and ii) zero flux of hydrogen at the outer radius, $R_{system}$.

Figure 5:
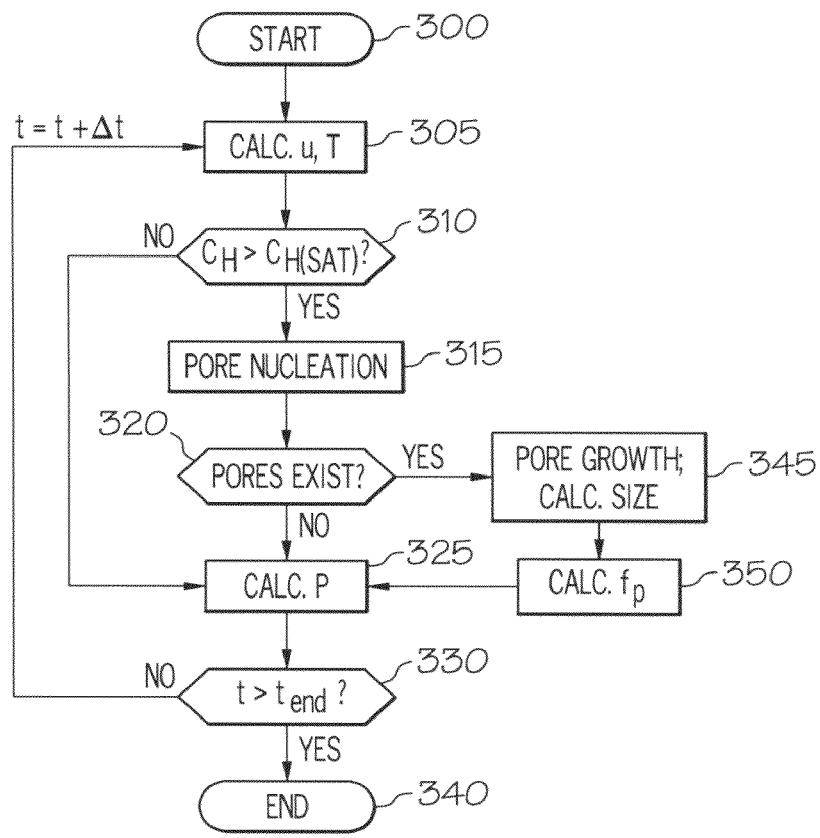
FIG. 5 is a flow chart for integrated pore growth and interdendritic flow model.

FIG. 5 is a flow chart showing the integrated pore growth and interdendritic flow model. The process is initiated at block 300. At block 305, u and T are calculated using equations 11-15. At decision block 310, the system determines whether $C_H > C_{H(sat)}$. If it is, the process continues to block 315 for pore nucleation. The program creates storage space for the data associated with the pores, including pore size and number density. At decision block 320, the system determines if pores exist. If there are no pores, the process moves to block 325 where the metal fluid pressure (P) is calculated using equations 11 and 12. The process moved to decision block 330 where it determines whether $t > t_{end}$. If it is the process ends at block 340. If t is not greater than $t_{end}$, the process returns to block 305 where the process is repeated for $t = t + \Delta t$.

At block 310, if the system determines that $C_H$ is not greater than $C_{H(sat)}$, the process moves to block 325 and calculates P.

At block 320, if the system determines that pores exist, it proceeds to block 340 to determine pore growth and calculate pore size using equations 16, 17, 18, and 19. The process continues to block 345 where $f_p$ is calculated by dividing the sum of the pore volume within the element by the element volume, then moves to block 325 to calculate P, as described above.

This step can be used in the casting defects and microstructure modeling module 230.

B. Secondary Dendrite Arm Spacing (SDAS)

Secondary dendrite arm spacing (SDAS) is one of the measures reflecting the fineness of the microstructures of cast aluminum alloys. The value of the secondary dendrite arm spacing is directly related to local cooling rate of the material during solidification. The secondary dendrite arm spacing can be estimated using the expression:

$$SDAS = B \cdot R^\alpha \quad (20)$$

where $R = dT/dt$ represents the mean cooling rate of the primary aluminum dendrite cells during solidification; B and $\alpha$ the materials parameters. For cast aluminum alloys of 356 and 357, the parameters of B and $\alpha$ are 39.4 and −0.317, respectively. For cast aluminum alloy of 319, the parameters of B and $\alpha$ are determined as 39.4 and −0.279, respectively.

This step can be used in the casting defects and microstructure modeling module 230.

C. Replacement of the Risers with a Boundary Condition

When modeling microporosity formation, the interface between the casting and the mold is impermeable. The interface between the casting and the risers is permeable; liquid metal can flow across this boundary from the risers into the casting, where the flow velocity is given by Equation 11. In this case, not only is the interfacial area between the riser and the casting needed, but also the actual riser volume.

Under conditions where the riser design is proprietary and not known, the risers can be replaced with a boundary condition as follows. In this case, the actual riser volume is not needed, but the interfacial area between the riser and the casting is needed. The flow from the riser into the casting will be given by:

$$u = -\frac{K}{\mu}\left(\frac{P_0 - P_b}{H_{riser}} - \rho_l g\right) \quad (21)$$

where $P_0$ is the atmospheric pressure at the top of the riser, $P_b$ is the pressure at the boundary and $H_{riser}$ is the height of the riser. $P_b$ is unknown a priori; however, it is one of the field variables which is solved for during the microporosity simulation, thus providing a natural boundary condition on the flow rate at the riser boundary.

This step can be used in the gating/riser layout and riser boundary condition 270 of FIG. 3.

Example 1

Verification of Microstructure and Microporosity Models

Experimental plate castings were made to test the accuracy of the integrated pore growth and interdendritic flow model under two sets of casting conditions. The plates were 5 cm thick×14.0 cm wide×26 cm tall. The castings were gravity poured with a conventional sprue/pouring basin and were side gated into the cavity. A sand mold was used with a copper chill at the bottom to promote directional solidification over a wide range of cooling rates.

Figure 6:
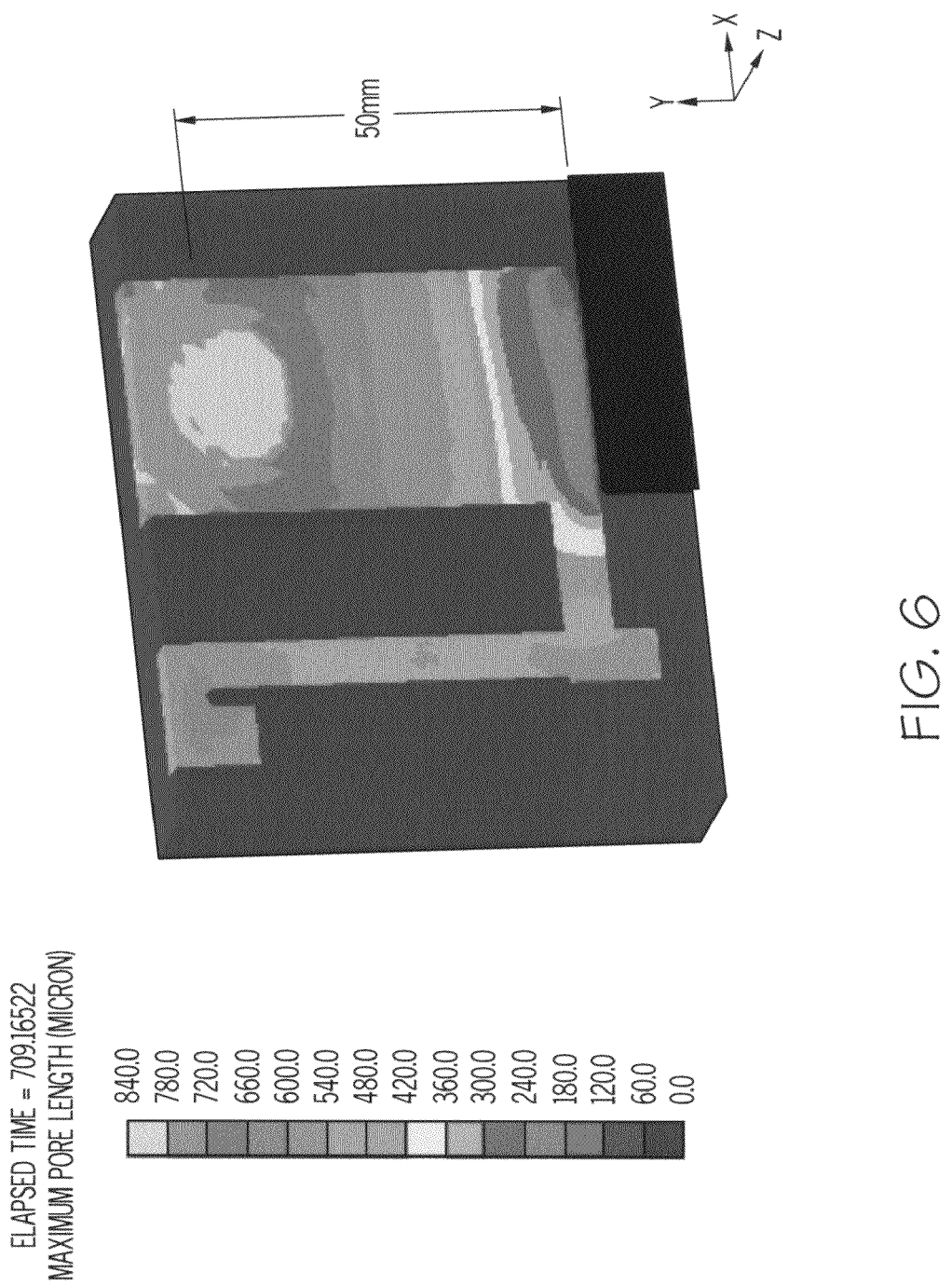
FIG. 6 is a contour plot showing maximum pore sizes on the centerline cross section of the chill plate predicted by the integrated pore growth and interdendritic flow model.

FIG. 6 is a contour plot showing maximum pore sizes on the centerline cross section of the chill plate predicted by the integrated pore growth and interdendritic flow model: $H_2$ content=0.3 cc/100 g.

Figure 7A:
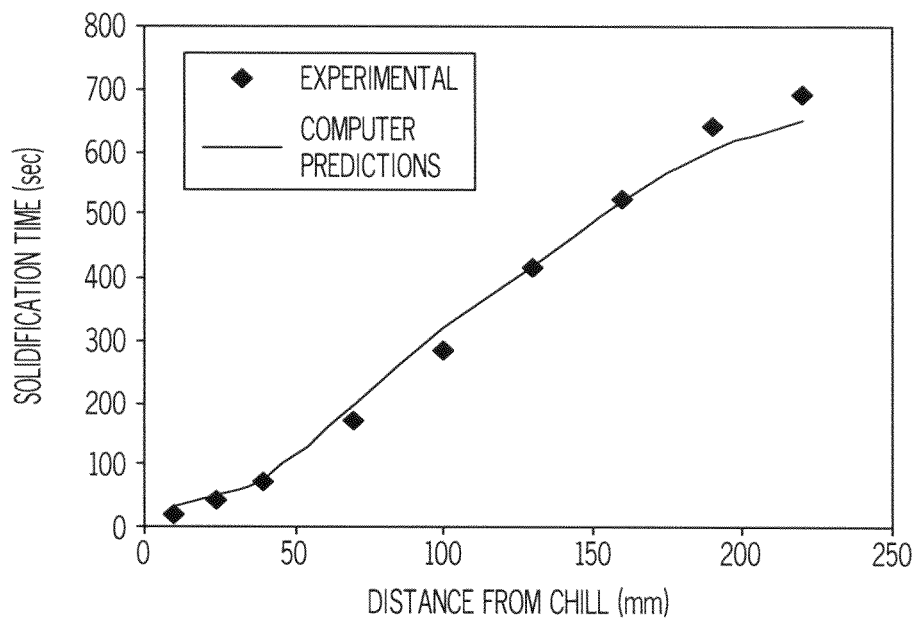
FIGS. 7A-B are graphs showing (a) Solidification time and (b) SDAS as a function of distance from copper block chill in the test cavity.
Figure 7B:
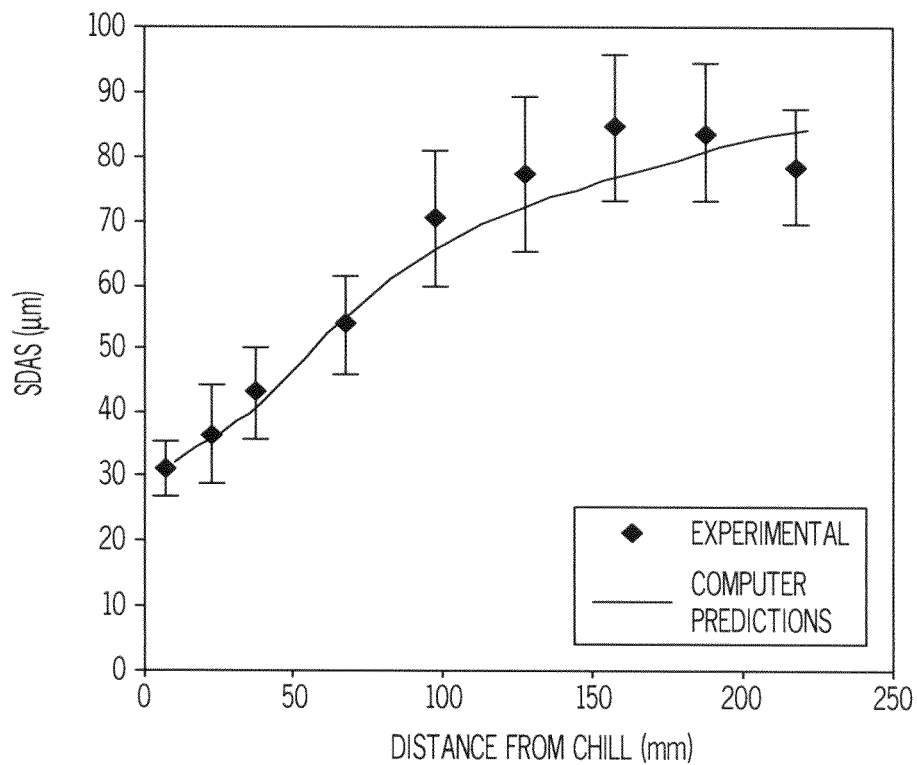

Table I shows the materials properties for A356 aluminum used in the computer simulation. A comparison of solidification time (liquids to solidus) between experimental measurements and a computer simulation is shown in FIG. 7(a). Following implementation of time-dependent heat transfer coefficients to reflect the formation of an air gap between the metal and the mold, computer predictions were found to be in reasonably good agreement with experimental results. The secondary dendrite arm spacing, SDAS (FIG. 7(b)) is also predicted quite accurately for the entire casting plate.

TABLE I

Material Property Data for the Chill Plate Simulation

| | Symbol | Value | Units |
|---|---|---|---|
| Hydrogen diffusivity in liquid | $D_H^l$ | $D_H^l = 3.8 \times 10^{-2} \exp(-2315/T)$ | cm²/s |
| Hydrogen diffusivity in solid | $D_H^s$ | $D_H^s = 2.85 \times 10^{-1} \exp(-6096/T)$ | cm²/s |
| Hydrogen solubility | $K_l$ | $\ln(K_l) = -3.29 - (6198.5/T)$ | wt pct H |
| Secondary dendrite arm spacing | SDAS | $SDAS = 39.4 (\partial T/\partial t)^{-0.317}$ | μm |
| Liquidus, solidus temperatures | $T_l, T_x$ | 615, 560 | ° C. |
| Binary eutectic temperature | $T_e$ | 567 | ° C. |
| Latenet heat | L | 95 | cal/g |
| Hydrogen content | $C_{H_e}$ | 0.30, 0.13 | cc/100 g |
| Hydrogen partition coefficient | k | 0.069 | — |
| Al₁—H₂ surface tension | $\sigma_{LG}$ | 0.856 | Pa · m |

Figure 8A:
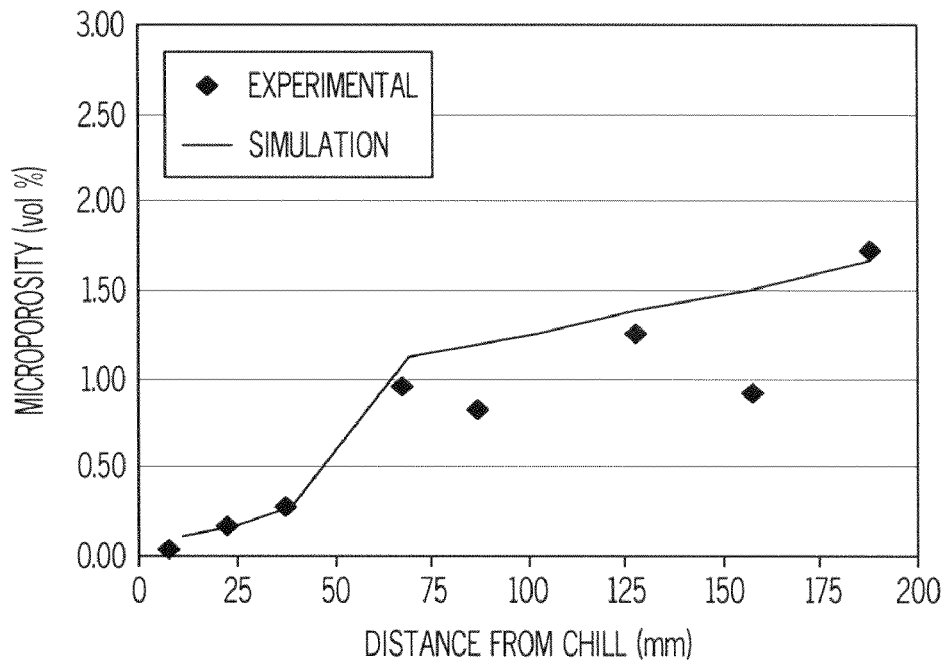
FIGS. 8A-B are graphs showing a comparison of predicted and measured microporosity volume fraction on the centerline cross section of the chill plate. (a) $H_2$ content=0.3 cc/100 g and (b) $H_2$ content=0.13 cc/100 g.
Figure 8B:
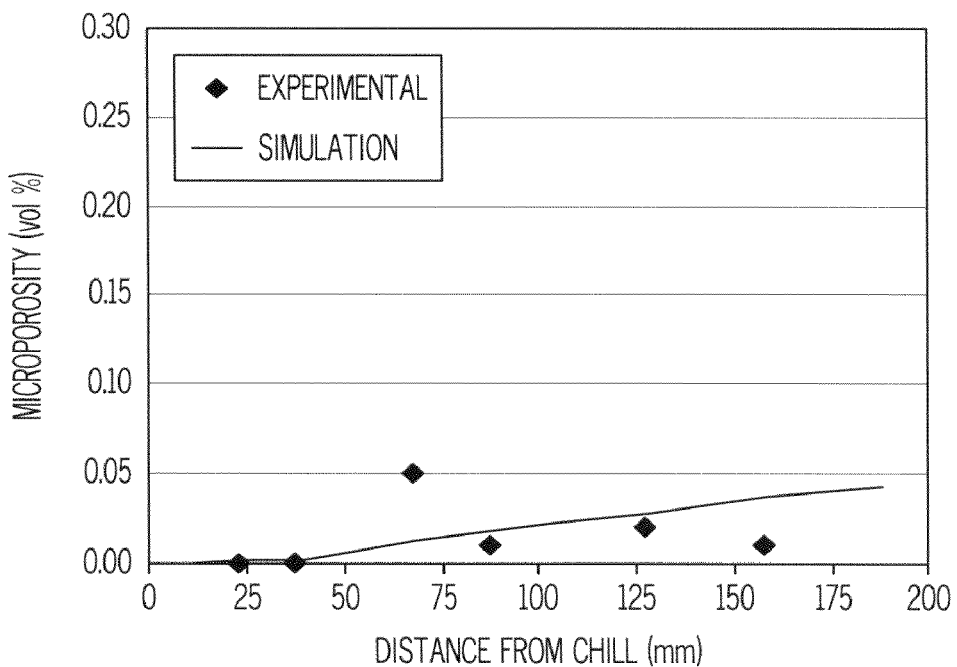
Figure 9A:
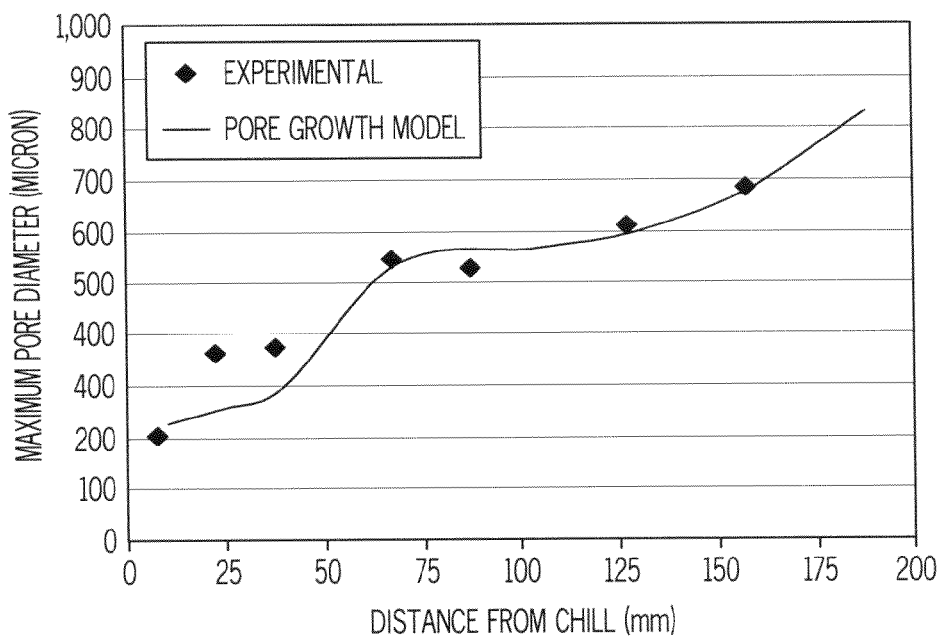
FIGS. 9A-B are graphs showing a comparison of predicted and measured maximum pore sizes on the centerline cross section of the chill plate. (a) $H_2$ content=0.3 cc/100 g and (b) $H_2$ content=0.13 cc/100 g.
Figure 9B:
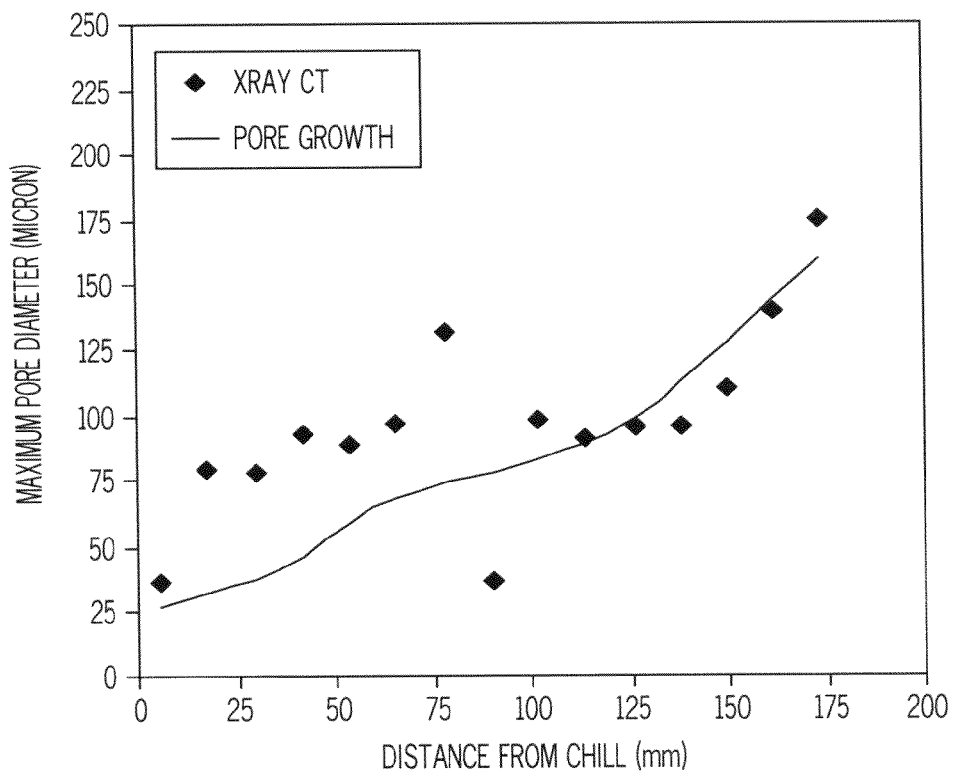

Computer predictions for volume fraction of porosity and maximum pore sizes are shown in FIGS. 8-9. A comparison between experimental and computer predictions shows that the developed integrated pore growth with interdendritic flow model can predict casting defect of porosity with high accuracy.

Example 2

Figure 10:
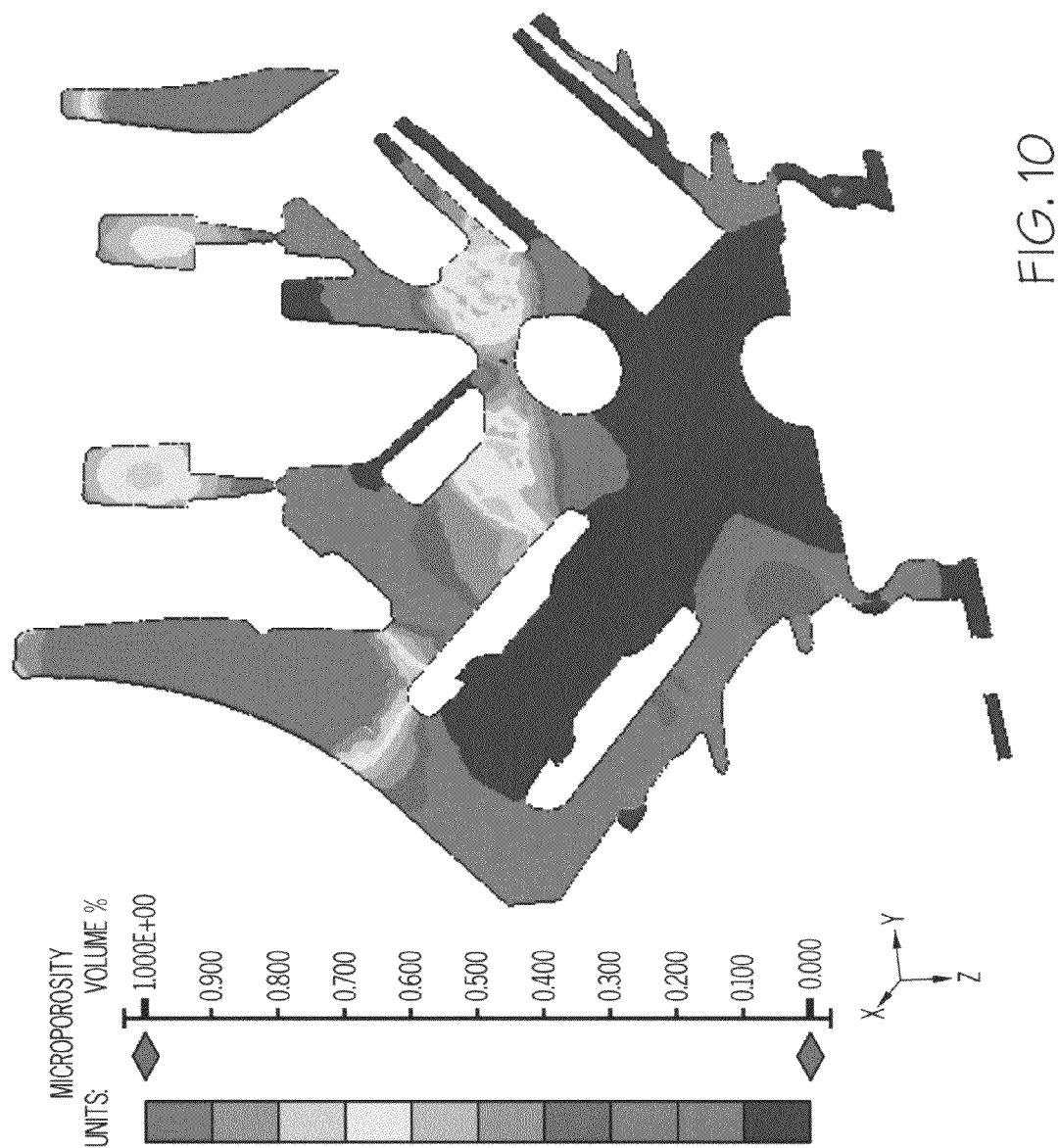
FIG. 10 shows the predicted microporosity distribution (vol %) in a cross-section of a V-8 engine block with the gating and riser system.
Figure 11:
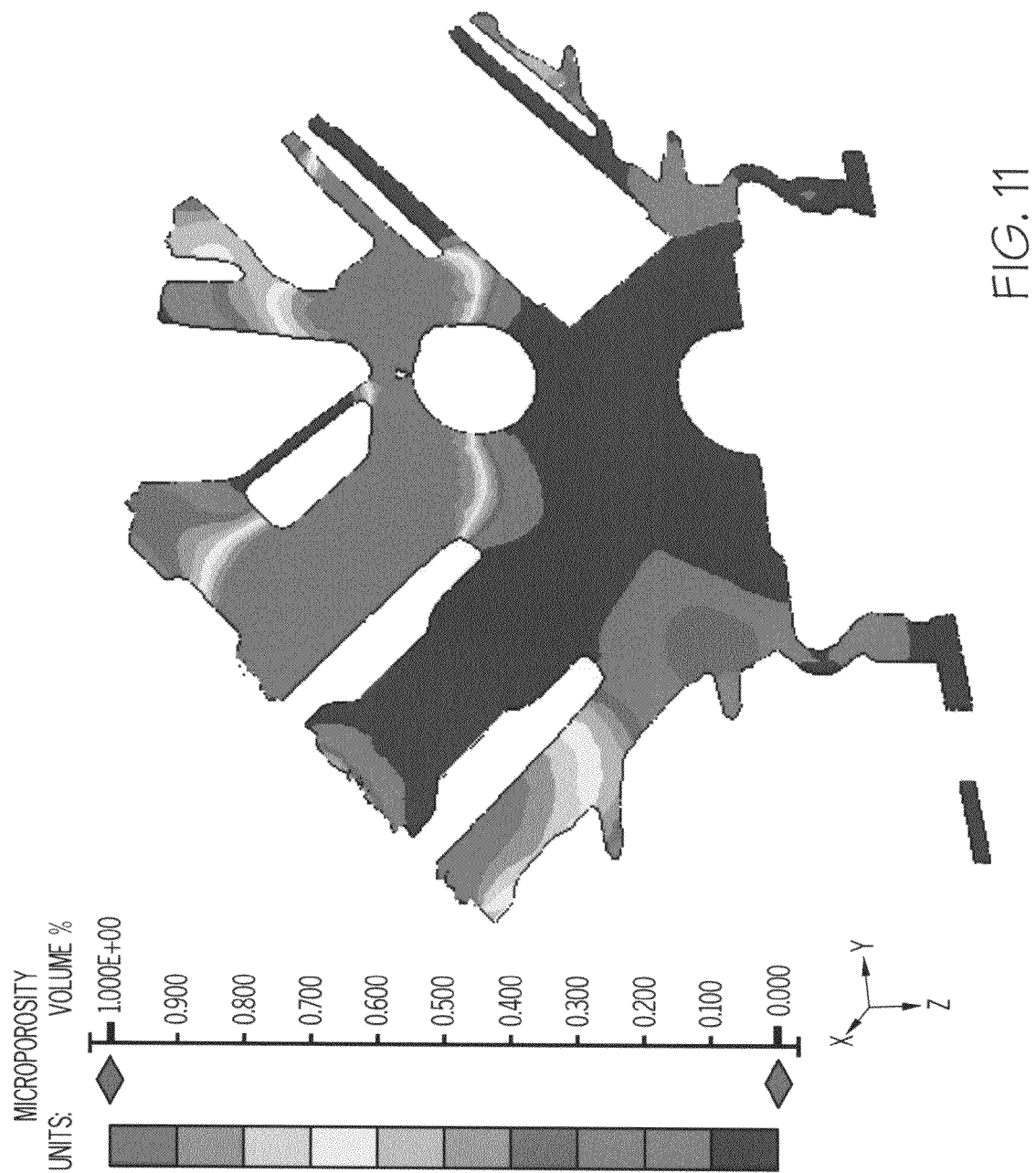
FIG. 11 shows the predicted microporosity distribution (vol %) in a cross-section of a V-8 engine block without the gating and riser system using the prior art method.
Figure 12:
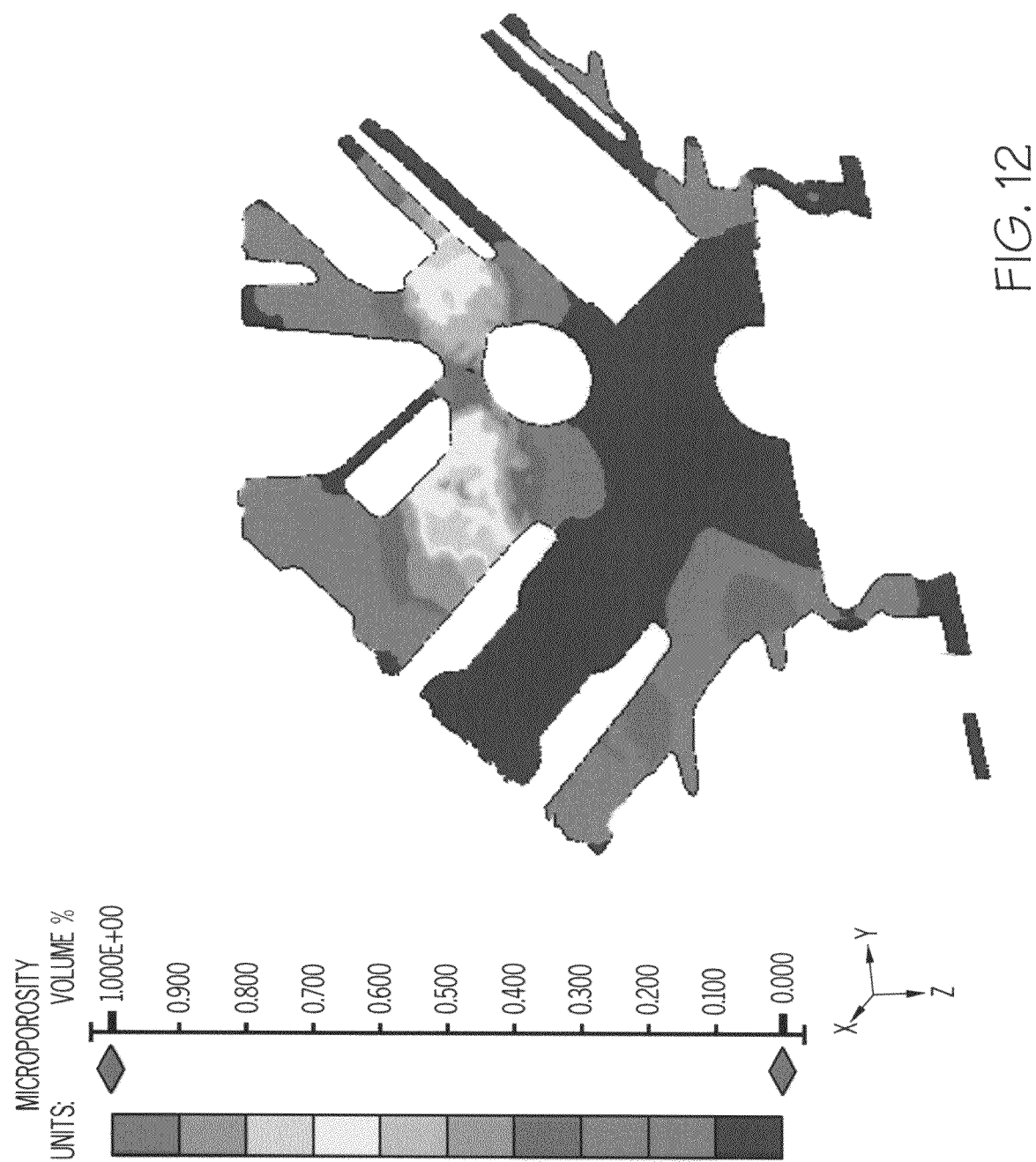
FIG. 12 shows the predicted microporosity distribution (vol %) in a cross-section of a V-8 engine block without the gating and riser system using one embodiment of the present invention.

The developed simulation methodology described above has been applied to an engine block. The engine block was simulated together with the gating/riser system. FIG. 10 shows the simulated microporosity distribution in terms of volume fraction (vol %) in a cross-section of the engine block. By taking the gating/riser out and applying normal boundary condition (using the prior art method), the predicted microporosity in many locations of the engine block tends to be higher than what it is supposed to be, as shown in FIG. 11. As FIG. 12 shows, the predicted microporosity in the engine block without gating/risers using the method described above is very similar to the simulation results of the engine block with gating/risers (as in FIG. 10).

Figure 13:
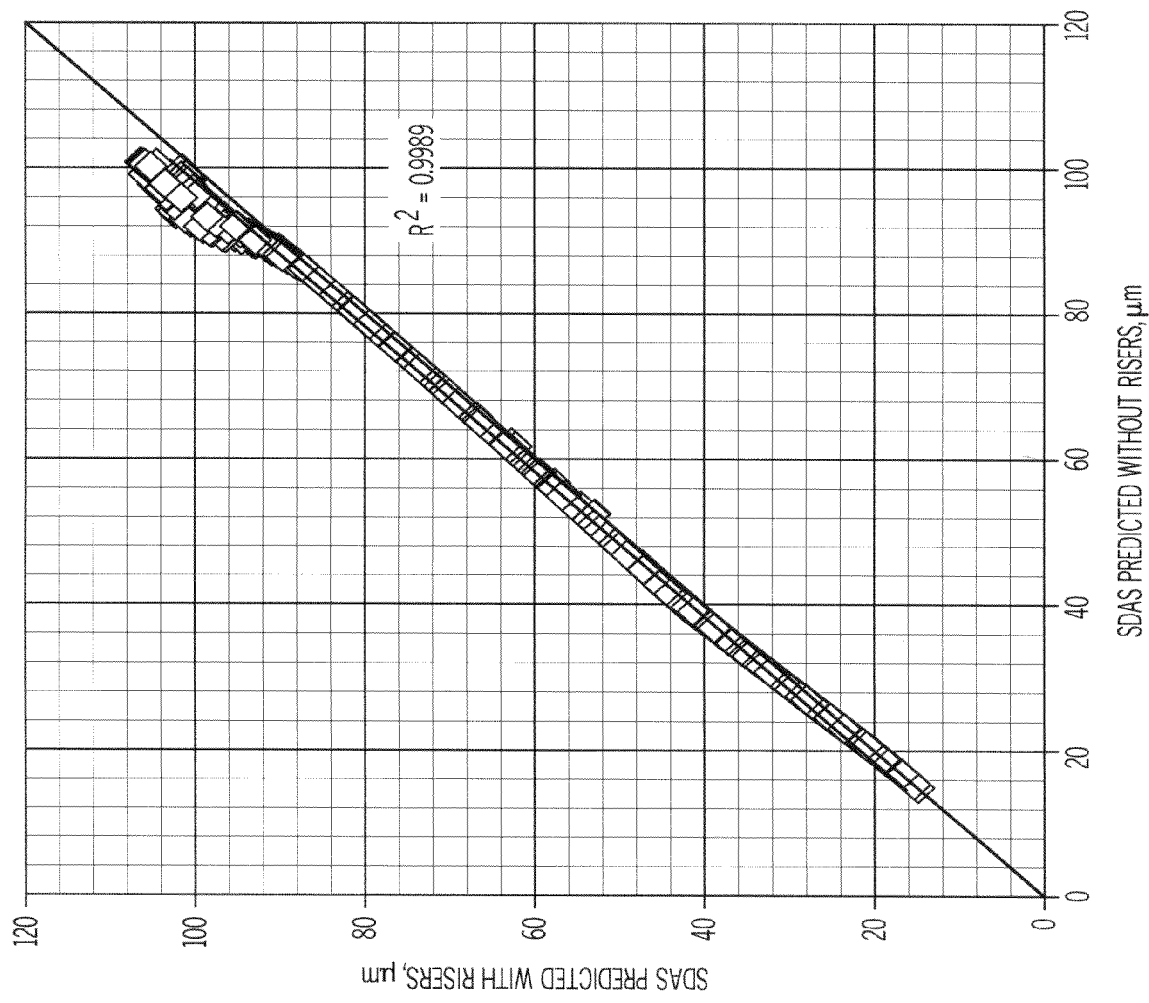
FIG. 13 is a graph showing a comparison of predicted SDAS in an engine block (10,000 data points shown) with or without riser geometry in the simulation.
Figure 14:
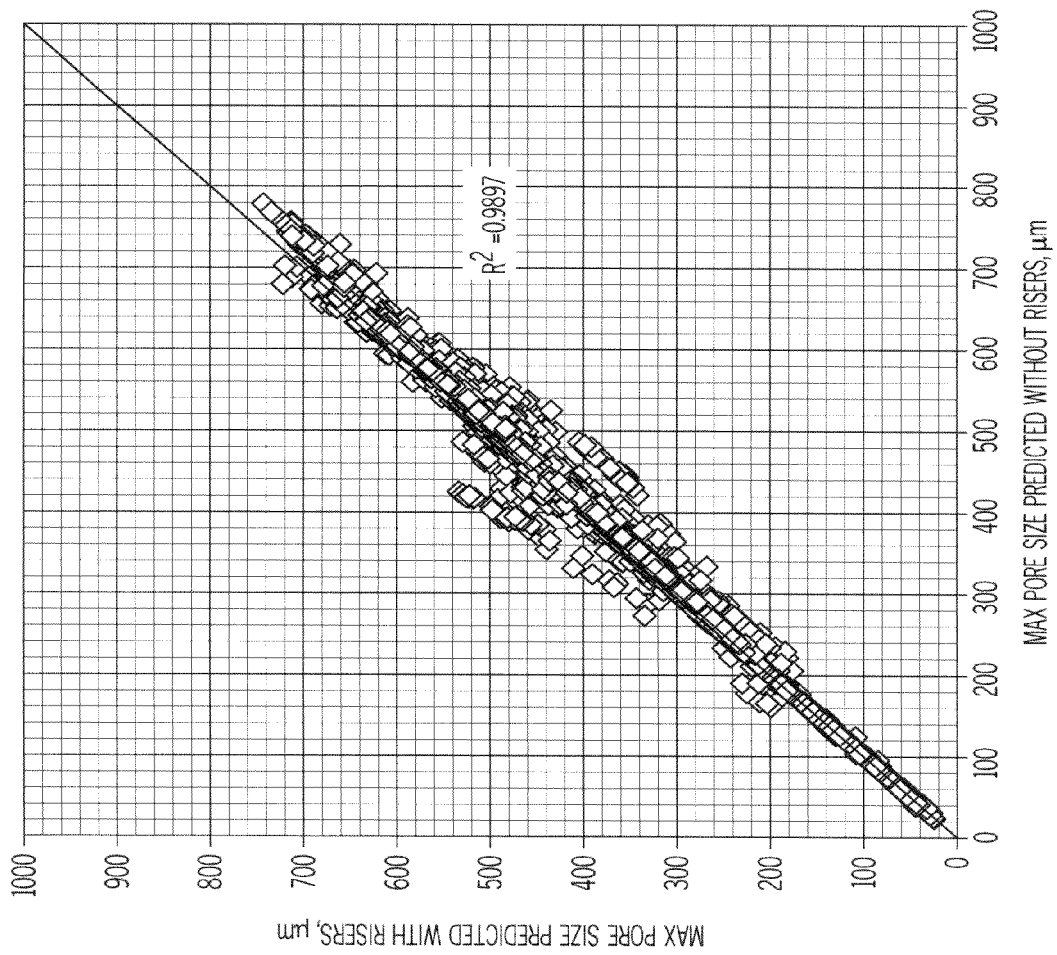
FIG. 14 is a graph showing a comparison of predicted maximum pore sizes in an engine block (10,000 data points shown) with or without riser geometry in the simulation.

FIGS. 13 and 14 show direct comparison of 10,000 data points taken from the simulated engine block mentioned above. FIG. 13 compares the secondary dendrite arm spacing (SDAS) predicted for the engine block with or without gating/riser system. FIG. 14 compares the predicted pore sizes for both cases. It is seen that the developed simulation technology can predict microstructure such as SDAS and casting defects of the parts supplier's castings to a high accuracy without knowing the detailed casting and process design from the parts supplier.

It is noted that while the majority of the description provided herein is specific to an embodiment of the present invention relating to a system to predict casting defects and microstructure of an aluminum casting, the same description applies equally consistently to other embodiments of the present invention relating to methods and articles of manufacture to predict the casting defects and microstructure of aluminum casting, as well as to other metals and alloys, and to machined parts.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," " and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A system to predict casting defects and microstructures of a part comprising:
    an information input configured to receive information relating to at least one of a temperature distribution during solidification, a hydrostatic pressure distribution after mold fill, a part geometry model, material, melt quality, and thermodynamic database;
    an information output configured to convey information relating to at least one of a size, volume percent, and distribution of casting defects and microstructures of a part predicted by the system;
    a processing unit; and
    a computer-readable medium comprising a computer-readable program code embodied therein, the computer-readable medium cooperative with the processing unit, the information input, and the information output such that the information input is operated upon by the processing unit and computer-readable program code to be presented to the information output as the information relating to the size, volume percent, or distribution of casting defects and microstructures predicted by the system, the computer-readable program code comprising a casting defects and microstructure modeling module:

wherein the casting defects and microstructure modeling module simulates the casting defects in the part, the microstructure of the part, or both using an integrated pore growth and interdendritic flow model; and wherein the casting defects and microstructure modeling module simulates the casting defects in the part, the microstructure of the part, or both using the following equation $$u = -\frac{K}{\mu}\left(\frac{P_0 - P_b}{H_{riser}} - \rho_l g\right) \tag{21}$$

where u is the superficial velocity vector; K is the permeability; μ the viscosity; $\rho_l$ the liquid density; g is the gravity vector; $P_0$ is the atmospheric pressure at the top of the riser; $P_b$ is the pressure at the boundary; and $H_{riser}$ is the height of the riser.

2. The system of claim 1 wherein the computer-readable medium comprises a numeric analytical solver comprising at least one of the solidification simulation module, and the casting defects and microstructure modeling module, and is cooperatively coupled with any of the solidification simulation module, and the casting defects and microstructure modeling module not comprising the numeric analytical solver.

3. The system of claim 2 wherein the numeric analytical solver comprises a finite element analysis based heat transfer code, or a finite difference analysis based heat transfer code.

4. The system of claim 1 wherein the casting defects and microstructure modeling module simulates the casting defects in the part, the microstructure of the part, or both using the following equations:

$$\nabla \cdot u = \left(\frac{\rho_s}{\rho_l} - 1\right)\frac{\partial f_l}{\partial t} + \frac{\partial f_p}{\partial t} \tag{12}$$

$$\frac{\partial (\rho C_p T)}{\partial t} = \nabla \cdot (\rho u T) + \nabla (\lambda \nabla T) - \rho L \frac{\partial f_l}{\partial t} \tag{13}$$

$$\frac{\partial (\rho C_H)}{\partial t} = -\nabla \cdot (\rho u C_H) + \nabla (\rho D_H \nabla C_H) \tag{14}$$

$$[C_{H0}] = (1 - f_l)[C_{Hs}] + f_l[C_{Hl}] + R\frac{P_g f_p}{T} \tag{15}$$

where: u is the superficial velocity vector; P is the pressure; $\rho_l$ is the liquid density; $\rho_s$ is the solid density; g is the gravity vector; $f_p$ is the pore volume fraction; $f_l$ is the liquid volume fraction; L is the latent heat of fusion; ρ is the average density; $C_p$ is the specific heat; λ is the thermal conductivity; $C_{H0}$ is the initial hydrogen concentration; $C_{Hs}$ is the solid phase concentration; $C_{Hl}$ is the liquid phase concentration; T is the temperature; and R is the universal gas constant.

5. The system of claim 1 wherein the casting defects and microstructure modeling module simulates the casting defects in the part, the microstructure of the part, or both using the following equations:

$$[C_{Hs}] = K_s P_g^{1/2} \tag{16}$$

$$[C_{Hl}] = K_l P_g^{1/2} \tag{17}$$

where $C_{Hs}$ is the solid phase concentration; $C_{Hl}$ is the liquid phase concentration; $K_s$ is the solid equilibrium coefficient; $K_l$ is the liquid equilibrium coefficient; and $P_g$ is the pressure of the hydrogen gas in the pores.

6. The system of claim 1 wherein the casting defects and microstructure modeling module simulates the casting defects in the part, the microstructure of the part, or both using the following equation:

$$P_g = P_{atm} + P_{metal} + \frac{2\sigma_{LG}}{R_{cur}} \tag{18}$$

where $P_g$ is the pressure of the hydrogen gas in the pores; $P_{atm}$ is atmospheric pressure; $P_{metal}$ is the pressure of liquid metal height; $\sigma_{LG}$ is the surface tension of the alloy; and $R_{cur}$ is the minimum radius of curvature of the pore.

7. The system of claim 1 wherein the casting defects and microstructure modeling module simulates the casting defects in the part, the microstructure of the part, or both using the following equation:

$$\frac{\partial \rho C_H}{\partial t} = \nabla (D_H \nabla C_H) + S_H \tag{19}$$

where ρ is the average density; $C_H$ is the hydrogen concentration; $D_H$ is the diffusion coefficient of hydrogen; $S_H$ is the hydrogen rejected to the liquid phase during solidification.

8. The system of claim 1 wherein the casting defects and microstructure modeling module simulates the casting defects in the part, the microstructure of the part, or both using the following equation:

$$SDAS = B \cdot R^\alpha \tag{20}$$

where R=dT/dt is the mean cooling rate of the primary aluminum dendrite cells during solidification; and B and α the materials parameters.

9. The system of claim 1 wherein the computer-readable program code further comprises a solidification module wherein the solidification simulation module:

calculates the heat transfer coefficient of the casting;

compares the calculated heat transfer coefficient of the casting with the temperature distribution during solidification; and minimizes the difference between the calculated heat transfer coefficient and the temperature distribution during solidification.

10. A method of predicting casting defects and microstructures of a part comprising:

providing a temperature distribution during solidification, a hydrostatic pressure distribution after mold fill, a part geometry model, material, melt quality, and thermodynamic database;

simulating the casting defects and microstructure of the part using an integrated pore growth and interdendritic flow model utilizing the provided data; and predicting at least one of the size, volume percent, and distribution of casting defects and microstructures of a part utilizing the simulation; and wherein the integrated pore growth and interdendritic flow model comprises the following equation:

$$u = -\frac{K}{\mu}\left(\frac{P_0 - P_b}{H_{riser}} - \rho_l g\right) \quad (21)$$

where u is the superficial velocity vector; K is the permeability; μ the viscosity; $\rho_1$ the liquid density; g is the gravity vector; $P_0$ is the atmospheric pressure at the top of the riser; $P_b$ is the pressure at the boundary; and $H_{riser}$ is the height of the riser.

11. The method of claim 10 wherein the integrated pore growth and interdendritic flow model comprises the following equations:

$$\nabla \cdot u = \left(\frac{\rho_s}{\rho_l} - 1\right)\frac{\partial f_l}{\partial t} + \frac{\partial f_p}{\partial t} \quad (12)$$

$$\frac{\partial(\rho C_p T)}{\partial t} = \nabla \cdot (\rho u T) + \nabla(\lambda \nabla T) - \rho L \frac{\partial f_l}{\partial t} \quad (13)$$

$$\frac{\partial(\rho C_H)}{\partial t} = -\nabla \cdot (\rho u C_H) + \nabla(\rho D_H \nabla C_H) \quad (14)$$

$$[C_{H0}] = (1 - f_l)[C_{Hs}] + f_l[C_{Hl}] + R\frac{P_g f_p}{T} \quad (15)$$

where: u is the superficial velocity vector; P is the pressure; $\rho_1$ is the liquid density; $\rho_s$ is the solid density; g is the gravity vector; $f_p$ is the pore volume fraction; $f_1$ is the liquid volume fraction; L is the latent heat of fusion; ρ is the average density; $C_p$ is the specific heat; λ is the thermal conductivity; $C_{H0}$ is the initial hydrogen concentration; $C_{Hs}$ is the solid phase concentration; $C_{Hl}$ is the liquid phase concentration; T is the temperature; and R is the universal gas constant.

12. The method of claim 10 wherein the integrated pore growth and interdendritic flow model comprises the following equations:

$$[C_{Hs}] = K_s P_g^{1/2} \quad (16)$$

$$[C_{Hl}] = K_l P_g^{1/2} \quad (17)$$

where $C_{Hs}$ is the solid phase concentration; $C_{Hl}$ is the liquid phase concentration; $K_s$ is the solid equilibrium coefficient; $K_1$ is the liquid equilibrium coefficient; and $P_g$ is the pressure of the hydrogen gas in the pores.

13. The method of claim 10 wherein the integrated pore growth and interdendritic flow model comprises the following equation:

$$P_g = P_{atm} + P_{metal} + \frac{2\sigma_{LG}}{R_{cur}} \quad (18)$$

where $P_g$ is the pressure of the hydrogen gas in the pores; $P_{atm}$ is atmospheric pressure; $P_{metal}$ is the pressure of liquid metal height; $\sigma_{LG}$ is the surface tension of the alloy; and $R_{cur}$ is the minimum radius of curvature of the pore.

14. The method of claim 10 wherein the integrated pore growth and interdendritic flow model comprises the following equation:

$$\frac{\partial \rho C_H}{\partial t} = \nabla(D_H \nabla C_H) + S_H \quad (19)$$

where ρ is the average density; $C_H$ is the hydrogen concentration; $D_H$ is the diffusion coefficient of hydrogen; $S_H$ is the hydrogen rejected to the liquid phase during solidification.

15. The method of claim 10 wherein the integrated pore growth and interdendritic flow model comprises the following equation:

$$SDAS = B \cdot R^\alpha \quad (20)$$

where R=dT/dt is the mean cooling rate of the primary aluminum dendrite cells during solidification; and B and α the materials parameters.

16. The method of claim 10 further comprising simulating a solidification of the casting, wherein simulating the solidification of the casting comprises:
calculating the heat transfer coefficient of the casting;
comparing the calculated heat transfer coefficient of the casting with the temperature distribution during solidification; and
minimizing the difference between the calculated heat transfer coefficient and the temperature distribution during solidification.

17. An article of manufacture to predict casting defects and microstructures of a part, the article of manufacture comprising an information input, an information output, a processing unit and a non-transitory computer usable medium, wherein:
the information input is configured to receive information relating to a temperature distribution during solidification, a hydrostatic pressure distribution after mold fill, a part geometry model, material, melt quality, and thermodynamic database;
the information output is configured to convey information relating at least one of a size, volume percent, and distribution of casting defects and microstructures of a part predicted by a system;
the non-transitory computer usable medium comprises computer-readable program code embodied therein for simulating the casting defects in the part, the microstructure of the part, or both using an integrated pore growth and interdendritic flow model; and
the non-transitory computer usable medium is cooperative with the information input and the information output such that the received information is operated upon by the processing unit to be presented to the information output as a prediction of the casting defects in the part, the microstructure of the part, or both; and
wherein the integrated pore growth and interdendritic flow model comprises the following equation:

$$u = -\frac{K}{\mu}\left(\frac{P_0 - P_b}{H_{riser}} - \rho_l g\right) \quad (21)$$

where u is the superficial velocity vector; K is the permeability; μ the viscosity; $\rho_1$ the liquid density; g is the gravity vector; $P_0$ is the atmospheric pressure at the top of the riser; $P_b$ is the pressure at the boundary; and $R_{riser}$ is the height of the riser.

18. The article of claim 17 wherein the integrated pore growth and interdendritic flow model comprises the following equations:

$$\nabla \cdot u = \left(\frac{\rho_s}{\rho_l} - 1\right)\frac{\partial f_l}{\partial t} + \frac{\partial f_p}{\partial t} \quad (12)$$

$$\frac{\partial(\rho C_p T)}{\partial t} = \nabla \cdot (\rho u T) + \nabla(\lambda \nabla T) - \rho L \frac{\partial f_l}{\partial t} \quad (13)$$

$$\frac{\partial(\rho C_H)}{\partial t} = -\nabla \cdot (\rho u C_H) + \nabla(\rho D_H \nabla C_H) \quad (14)$$

$$[C_{H0}] = (1 - f_l)[C_{Hs}] + f_l[C_{Hl}] + R\frac{P_g f_p}{T} \quad (15)$$

where: u is the superficial velocity vector; P is the pressure; $\rho_l$ is the liquid density; $\rho_s$ is the solid density; g is the gravity vector; $f_p$ is the pore volume fraction; $f_l$ is the liquid volume fraction; L is the latent heat of fusion; $\rho$ is the average density; $C_p$ is the specific heat; $\lambda$ is the thermal conductivity; $C_{H0}$ is the initial hydrogen concentration; $C_{Hs}$ is the solid phase hydrogen concentration; $C_{Hl}$ is the liquid phase hydrogen concentration; T is the temperature; and R is the universal gas constant.

19. The article of claim 17 wherein the integrated pore growth and interdendritic flow model comprises the following equation:

$$\frac{\partial \rho C_H}{\partial t} = \nabla(D_H \nabla C_H) + S_H \quad (19)$$

where $\rho$ is the average density; $C_H$ is the hydrogen concentration; $D_H$ is the diffusion coefficient of hydrogen; $S_H$ is the hydrogen rejected to the liquid phase during solidification.

20. The article of claim 17 wherein the non-transitory computer usable medium further comprises computer-readable program code embodied therein for simulating a solidification of the casting by calculating the heat transfer coefficient of the casting; comparing the calculated heat transfer coefficient of the casting with the temperature distribution during solidification; and minimizing the difference between the calculated heat transfer coefficient and the temperature distribution during solidification.

* * * * *